US005083889A

United States Patent [19]

Steinbock

[11] Patent Number: 5,083,889
[45] Date of Patent: Jan. 28, 1992

[54] STRUCTURE FOR PREVENTING ESCAPE OF JACK BOLTS IN APPARATUS TO MECHANICALLY STRESS A BOLT-TYPE FASTENER

[76] Inventor: Rolf H. Steinbock, 128 Greinbrier Rd., Carnegie, Pa. 15106

[21] Appl. No.: 592,792

[22] Filed: Oct. 4, 1990

[51] Int. Cl.⁵ .................... F16B 37/08; B25G 3/00
[52] U.S. Cl. .................... 411/432; 411/393; 411/916; 411/917; 403/320; 403/370
[58] Field of Search ............ 411/55, 393, 432, 916, 411/917; 403/343, 320, 370

[56] References Cited

U.S. PATENT DOCUMENTS

| 3,618,994 | 11/1971 | Gepfert et al. | 411/432 |
| 4,043,692 | 8/1977 | Hund | 403/370 |
| 4,304,502 | 12/1981 | Stratienko | 403/370 |
| 4,338,037 | 7/1982 | Deminski | 403/320 |
| 4,622,730 | 11/1986 | Steinbock | 411/432 |
| 4,810,919 | 3/1989 | Ponce et al. | 411/432 |

Primary Examiner—Neill R. Wilson
Attorney, Agent, or Firm—Clifford A. Poff

[57] ABSTRACT

An apparatus including a plurality of jack bolts which are threadedly engaged with openings in a flange on a fastener to stress a shank part of the fastener. The flange can be a collar retained on a shaft by a retainer, a nut on a threaded end of a bolt, or the head portion of a bolt. The jack bolts can be arranged in a flange on an end of a tension rod to stress arbors against opposite sides of a roll sleeve to form a roll assembly for use in a rolling mill. The apparatus includes structure for preventing escape of the jack bolts from the flange which is particularly advantageous when the apparatus is secured to moving machinery where the presence of escaped jack bolts could cause damage to the machinery.

2 Claims, 5 Drawing Sheets

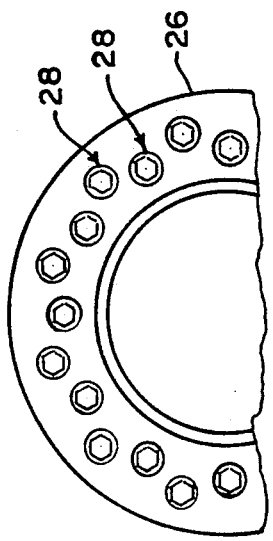
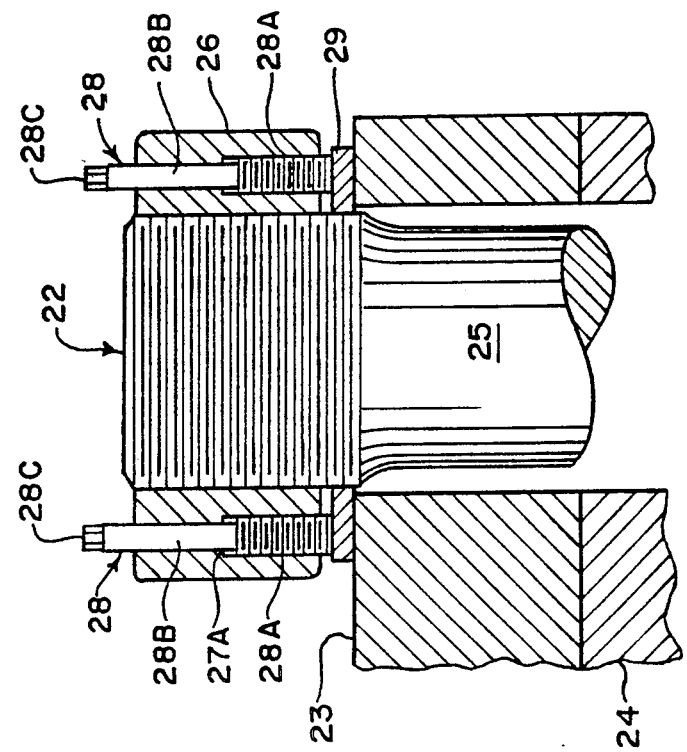
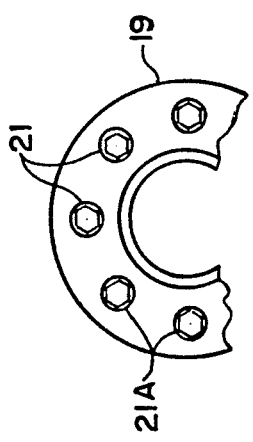
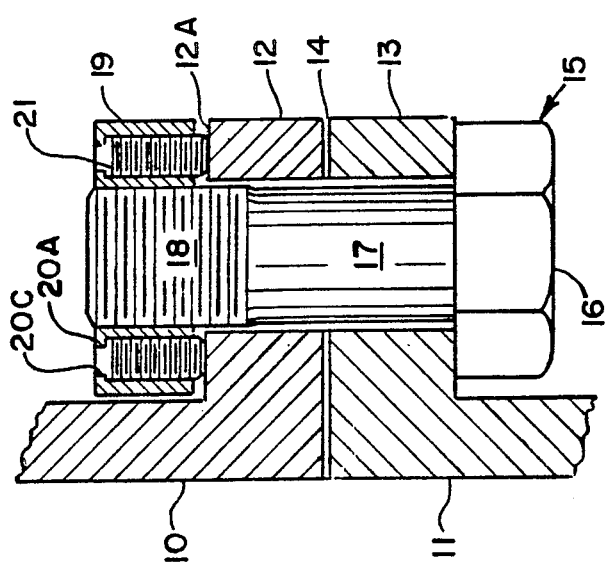

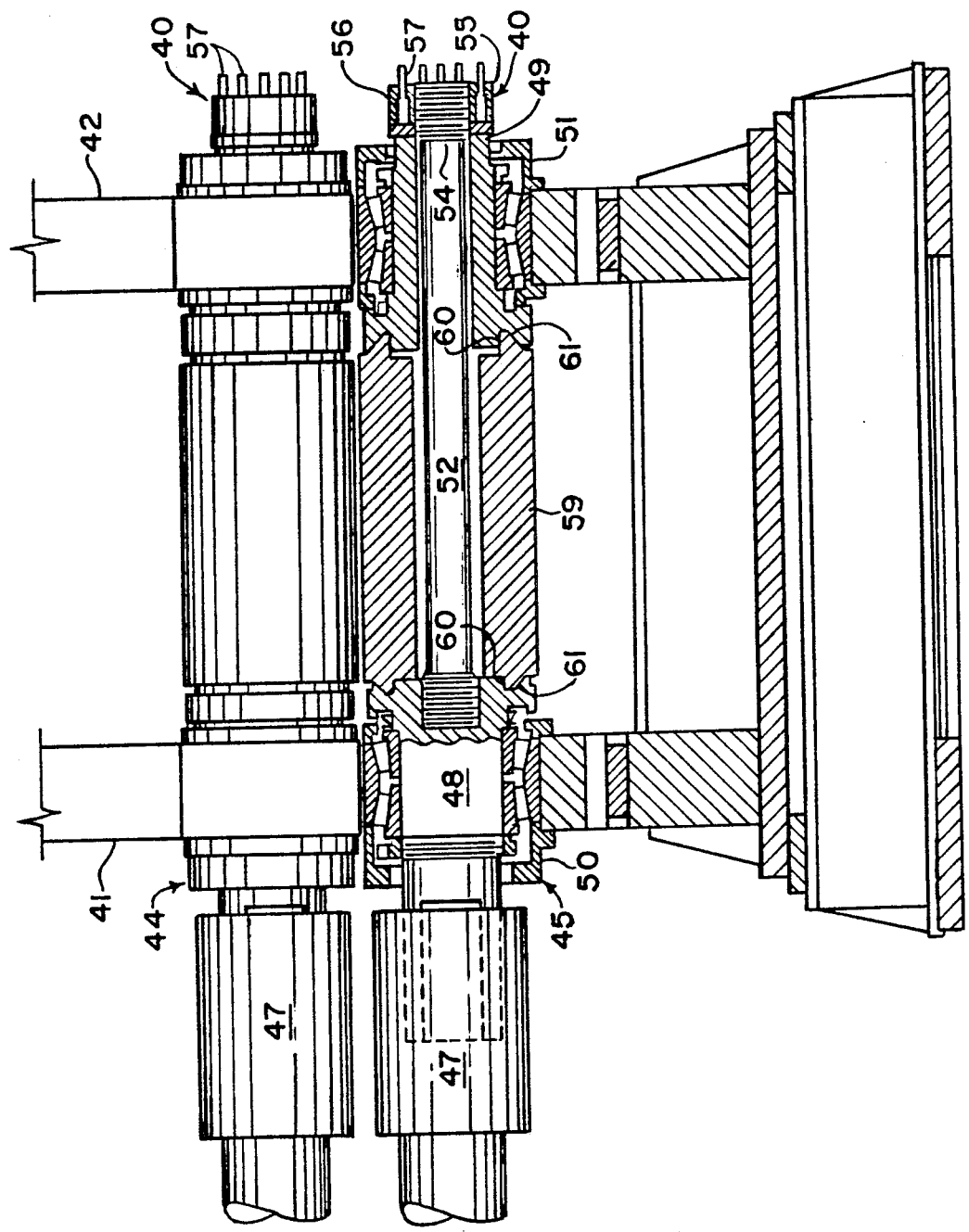
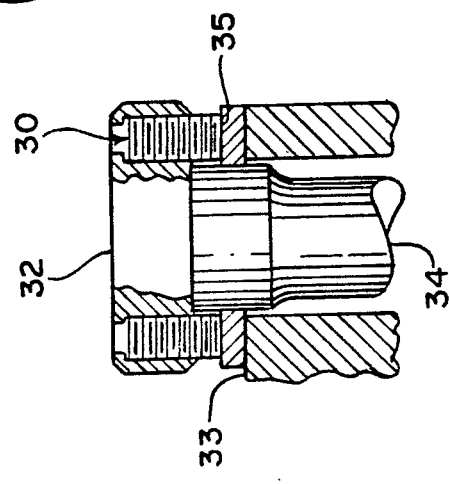
FIG. 4
FIG. 3B
FIG. 3A

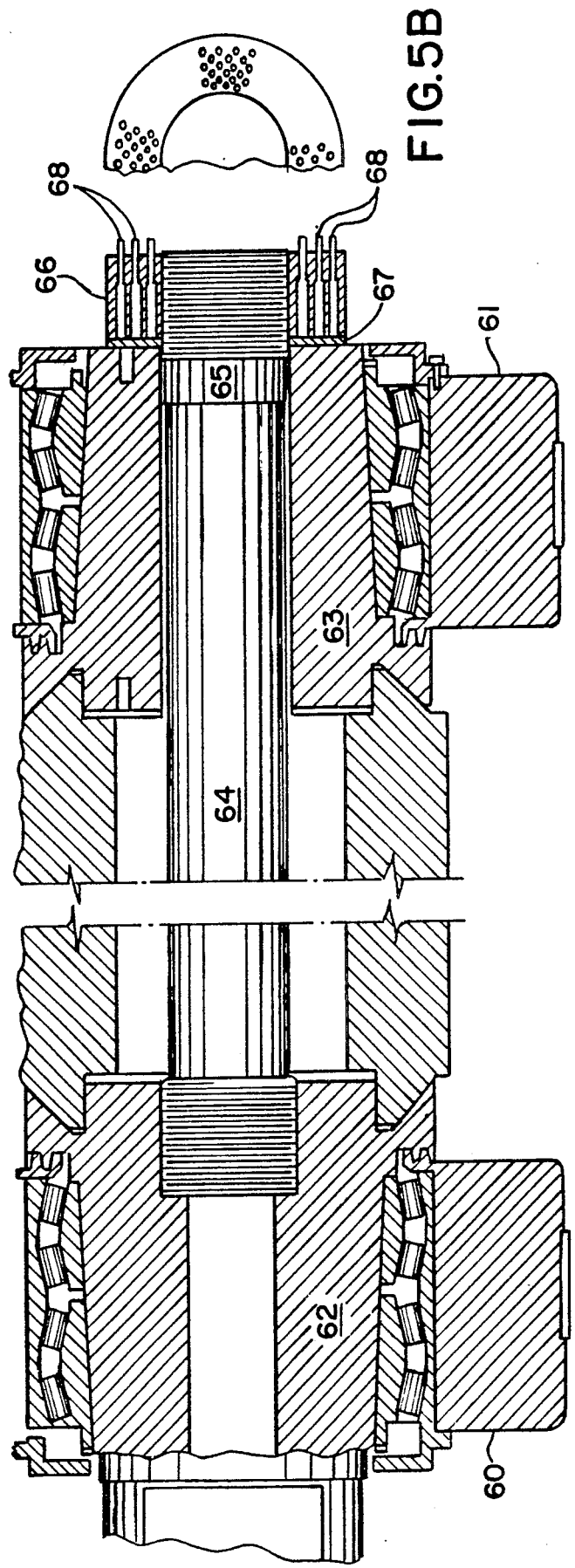

STRUCTURE FOR PREVENTING ESCAPE OF JACK BOLTS IN APPARATUS TO MECHANICALLY STRESS A BOLT-TYPE FASTENER

BACKGROUND OF THE INVENTION

1. Field of the Invention

The present invention relates to apparatus to stress a shank part of a fastener such as a bolt, shaft, or a stud, and more particularly to providing a plurality of jack bolts arranged at spaced-apart locations to extend between a surface of a support and an outer peripheral part of a flange for stressing the fastener through torque applied to the various jack bolts. The flange can be an integral part of the shank or the flange can be retained on the shank by, for example, threads, any of numerous forms of a retainer ring, or a fastener. The apparatus of the present invention can be used, for example, to clamp arbors against opposite sides of a roll sleeve to form a roll assembly. The apparatus includes structure for preventing escape of the jack bolts from the flange which is particularly advantageous when the apparatus is secured to moving machinery where the presence of escaped jack bolts could cause damage to the machinery 2. Description of the Prior Art It is a common practice for workmen to stress a bolt by applying torque to the bolt head to advance a threaded portion along threads in a tapped hole or a nut member so that the shank portion of the bolt is placed under a desired or predetermined mechanical stress. The stress imparted to the shank portion of the bolt can be determined by using a torque wrench to measure the torque applied to the bolt or by using other means to measure the applied force by a spanner wrench. The torque may be applied to the head portion of the bolt or to the nut. A stud can be stressed in a similar way by torque applied to a nut engaged with a threaded portion of the stud. The present invention is designed to permit stressing of a large fastener, e.g., a bolt or a stud, having a diameter generally one inch or larger. The magnitude of stress that can be applied to a bolt, stud or similar fastener has limits of practicality, particularly with respect to workmen. A one-inch diameter threaded bolt made of high-strength material can be tightened by the use of a spanner wrench to the elastic limit of the material. With coarse threads, a stress to the elastic limit of the material requires about 1000 ft-lb of torque, e.g., 100 pounds of force applied by a 10-foot lever. Under ordinary conditions, this exceeds both the practical length of the lever and the amount of force a workman can deliver to the lever. Under usual conditions, a workman using a spanner wrench cannot stress the shank of a nut and bolt assembly that is four inches in diameter with coarse threads to 57,000 ft-lb which is the torque required to stress the bolt to the elastic limit of a typical material comprising the nut and bolt. To develop torque of this magnitude, 5700 pounds of force must be applied to a 10-foot long lever which cannot be accomplished without employing massive machinery or special facilities.

Hydraulically-powered devices are known in the art for stressing or tensioning the shank portion of a fastener but such devices are undesirable because the magnitude of force which can be developed is restricted to available mounting space for the device. If space is available for mounting a hydraulic tensioning device, it is typically necessary to develop a hydraulic pressure of about 15,000 psi. Examples of such hydraulic tensioning devices can be found in U.S. Pat. Nos. 3,835,523; 3,841,193; 3,886,707; 4,075,923; and 4,182,215.

Thermal shrinkage is a much older method for stressing a bolt. The bolt is first heated to elongate its shank. The bolt is then torqued to a precalculated stress and finally the bolt is allowed to cool so that upon cooling, thermal shrinkage tensions the bolt. Usually, this method cannot be used where the amount of stress must be accurately controlled or precisely established. It is also difficult to unscrew the bolt from the threaded member without reheating the bolt.

It is also known, as described in my prior Reissue patent application no. 07/272,719 which has issued as Reissue U.S. Pat. No. Re. 33,490, to provide an apparatus to stress a fastener which includes a shank part extending to a flange having a plurality of spaced-apart holes spaced about an outer peripheral part thereof to overlie a support member, and a plurality of jack bolts threadedly engaged with the holes to separately receive a torque, the jack bolts having end parts extending from the holes and adapted to abut against the support member under an applied torque to develop a stress sufficient to tension the shank part by applying a compressive reaction force against the support member. The disclosure of Reissue U.S. Pat. No. Re 33,490 is hereby incorporated herein by reference.

The apparatus disclosed in Reissue U.S. Pat. No. Re 33,490 is extremely effective in performing the functions for which it was designed. That is, it is capable of stressing a fastener to immense levels of tension. The present invention is similar in construction to the apparatus described in Reissue U.S. Pat. No. Re 33,490 but includes a number of novel modifications to such apparatus which represent material advancements in the art. Specifically, the present invention finds particularly beneficial application when the fastener stressing apparatus is secured to moving machinery. In such an environment, motion and/or vibration of the machinery may occasionally cause one or more of the jack bolts to loosen in the holes in which they are threaded. If left unchecked, the jack bolts could fully loosen and escape from their threaded holes. The escaped jack bolts may then become caught up in the moving elements of the machinery and cause damage to the machinery. The present invention provides means for effectively preventing escape of the jack bolts.

It is an object of the present invention to provide an apparatus for stressing a shank portion of a bolt, shaft or stud such as a fastener by relatively simple mechanical means through which high stress levels can be obtained with reasonable accuracy.

It is a further object of the present invention to provide an apparatus embodying a compact construction of parts that can be economically produced for stressing the shank portion of a fastener.

It is a still further object of the present invention to provide an assembly wherein a tapered shaft is arranged to fixedly support machine elements thereon under stress imparted by a fastener apparatus attached to a shank portion of the shaft.

It is yet a further object of the present invention to provide an apparatus for stressing a shank portion of a bolt, shaft or stud including structure for preventing escape of jack bolts from the apparatus, particularly when the apparatus is secured to moving machinery.

Still other objects and advantages will become apparent in light of the attached drawings and written description of the invention presented hereinbelow.

SUMMARY OF THE INVENTION

The present invention provides an apparatus to stress a fastener which includes a shank part extending to a flange having a plurality of spaced-apart holes spaced about an outer peripheral part thereof to overlie a support member, and a plurality of jack bolts threadedly engaged with the holes to separately receive a torque, the jack bolts having end parts extending from the holes and adapted to abut against the support member under an applied torque to develop a stress sufficient to tension the shank part by applying a compressive reaction force against the support member.

The support member may include a washer-like member that can be pressed against a suitable face surface of the support structure. A face surface of a washer-like member directed in a generally confronting relation to the flange on the shank part of the fastener can be hardened to withstand the force of the jack bolts, or, if desired, the face surface can be made soft relative to the material of the jack bolts to avoid upsetting contacting end faces of the jack bolts. The flange is provided with an opening or threads to engage with a shank of a bolt, stud or shaft. When the flange takes the form of a ring, a retainer such as a split ring, a snap ring, or interlocking fastener, is used to secure the flange to the shank. The magnitude of the compressive force on each jack bolt is only a fractional part of the stress imparted to the shank portion of the fastener. A nut member, or a head portion of a standard nut and bolt assembly, provides sufficient space for threaded engagement of bolts about one or more bolt circles to stress the shank part of the bolt to a magnitude that will at least equal the strength of the bolt shank. Moreover the apparatus of the present invention is equally useful in specialized applications including a roll assembly for a rolling mill in which the roll assembly includes arbor members that are pulled together against opposite sides of a sleeve under a tremendous clamping force. This clamping force is developed by stress imparted to a shaft connected at one end to one of the arbors and extending through an opening in the other arbor so that an end portion of the shaft projecting therefrom can be provided with a flange. The flange can carry a multitude, e.g., between 10 and 500 or more jack bolts while pressing against the arbor. Means other than a flange and jack bolts can be used to stress the arbors against the roll sleeve. A clamping force of more than 12,000,000 pounds on the roll sleeve can be established. By this arrangement of parts, a roll assembly with a roll body diameter of 50 inches and a width of 86 inches can be provided for use as a backup roll in a hot strip rolling mill or a cold rolling mill.

The invention further provides a roll assembly including a tubular roll sleeve with opposite ends engaged for support by arbors, one of which is connected to a tension rod extending through the roll sleeve and through the other arbor, and means connected to a tension rod extending through the roll sleeve and through the other arbor, and means connected to the other arbor and the tension rod for stressing the arbors against opposite sides of the roll sleeve.

Lastly, the present invention provides means for preventing loosened jack bolts from escaping from the holes in the flange in which they are threaded which is particularly beneficial in environments wherein escaped jack bolts could get entrapped in moving machinery and potentially cause damage to the machinery.

BRIEF DESCRIPTION OF THE DRAWINGS

FIGS. 1A and 1B are longitudinal and end views, respectively, of one embodiment of a fastener apparatus embodying the features of the present invention;

FIGS. 2A and 2B are views similar to FIGS. 1A and 1B and illustrating a second embodiment of the fastener apparatus;

FIGS. 3A and 3B are views similar to FIGS. 1A and 1B and illustrating a third embodiment of the fastener apparatus;

FIG. 4 is an elevational view, partly in section, of a rolling mill wherein a roll assembly includes a fastener apparatus embodying the features of the present invention;

FIG. 5A is a longitudinal sectional view through a backup roll assembly for a rolling mill embodying the features of the present invention;

FIG. 5B is a partial end view of the roll assembly shown in FIG. 5A;

DESCRIPTION OF THE PREFERRED EMBODIMENTS

Figure 6:
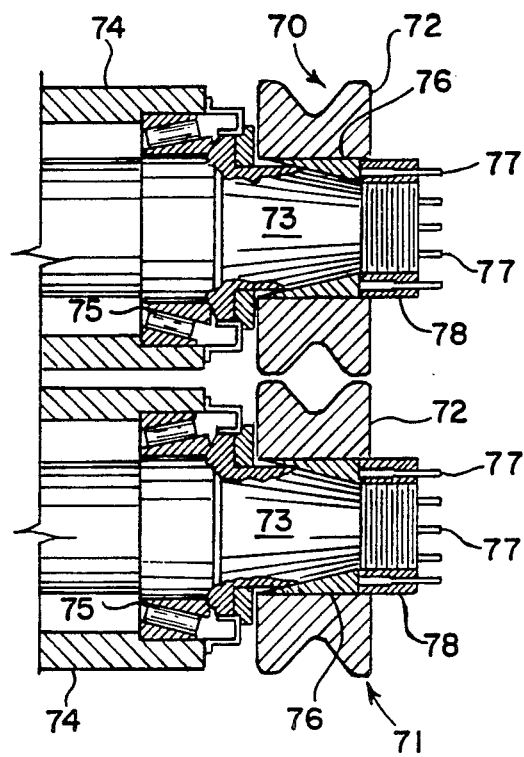
FIG. 6 is a view illustrating a further form of a roll assembly embodying the features of the present invention.

In FIGS. 1A and 1B, there is illustrated a fastener embodying the features of the present invention for forming part of a rotating drive tube flange assembly which includes two tube members 10 and 11 having flanges 12 and 13 which are clamped together. A gasket 14 is positioned between the flanges.

A plurality of fastener assemblies 15 are received in suitable openings which are spaced about the outer peripheries of the flanges. Each fastener assembly 15 includes a bolt member having a head portion 16, a shank portion 17 and a threaded end portion 18. The threaded end portion is engaged with a nut member 19. The nut member functions as a flange and includes a plurality of drilled and tapped holes 20 spaced about a bolt circle located between the outer edge of the nut and the threaded bore. As perhaps best seen in FIG. 7, each of the drilled and tapped holes 20, is tapped only from a "loading" side of the nut and the threading does not extend completely through to the other or "wrenching" side of the nut. Thus, a shoulder 20A is formed between the threaded region 20B of the drilled and tapped holes and a slightly reduced diameter unthreaded region 20C of each of the holes.

A jack bolt 21 is threadedly received in threaded region 20B of each hole 20 in the nut 19. The jack bolts may be of standard design. In the embodiment of the fastener apparatus illustrated in FIGS. 1 and 7, the jack bolts 21 are embodied as screw fasteners having recessed hexagonally-shaped "Allen" socket-head portions 21A formed therein for receiving a wrench (not illustrated) having an appropriate "Allen" fitting which is sized so as to just fit through the unthreaded regions 20C of the drilled and tapped holes 20. Each of the jack bolts 21 have length sufficient to extend through the threaded regions 20B and outwardly from the "loading" side of the nut to present an end portion extending into compressive or loading engagement with a support surface 12A provided by flange 12. It will be understood that the nut member 19 can be rotated on the threaded end portion 18 to contact or form a small gap between the nut member and surface 12A of flange 12. The jack bolts 21 are then rotated until their end portions extend from the loading side nut member to contact flange 12. It is preferable to torque the jack bolts in a patterned sequence such as by torquing a pair of jack bolts at opposite sides of the nut and then advancing to a next jack bolt pair in the bolt circle. A torque wrench or other control means such as an impact wrench with a variable torque setting can be used to tighten the jack bolts. Also, a lubricant such as graphite can be applied to the threads of the jack bolts to facilitate torquing thereof.

To further illustrate the utility of the present invention, let it be assumed that a fastener assembly 15 is 1½ inches, coarse-thread series, with six threads per inch. Ten jack bolts 21 can be arranged in a bolt circle in the nut member 19. When all the jack bolts are torqued to 60 ft-lb, the shank part 17 of the fastener is stressed to a maximum stress of 93,000 psi. By way of comparison, for example, the torque required to obtain the maximum stress level with a standard nut is 2700 ft-lb and this requires 270 pounds of force on a ten-foot lever arm of a torque wrench. Using the present invention, this same stress level can be developed by applying 60 pounds of force on a one-foot lever arm of a torque wrench to each of the ten jack bolts. In this example, the maximum total clamping force on the flange using fastener assembles of the present invention is 120,000 pounds. By way of a further example, a bolt size of 3½ inches with a coarse-thread series of four threads per inch can be provided with sixteen jack bolts in the nut member thereof. The fastener can be stressed to 96,000 pounds psi by torquing each jack bolt to 480 ft-lb which can be accomplished by applying 48 pounds of force to a ten-foot long lever arm of a torque wrench. By way of comparison, in order to achieve similar stress in a similar fastener assembly having no jack bolts, 40,000 ft-lb of torque must be applied directly to the nut member of the fastener assembly which is too high for torquing directly by a wrench.

A further advantage arises from the fastener apparatus construction represented in the embodiment of the present invention shown in FIGS. 1 and 1A. That is, because of the unthreaded region 20C in each drilled and tapped hole 20, the jack bolts cannot escape from the "wrenching" side of the nut member because shoulder 20A forms an abutment for preventing threading of the jack bolts beyond a predetermined position in a direction toward the wrenching side of the nut member. Thus, the shoulder 20A and reduced diameter region 20C of each drilled and tapped hole 20 serve as effective structural means for preventing escape of the jack bolts. Such means are particularly beneficial when the apparatus is secured to moving machinery, e.g., the system including rotating drive tubes 10 and 11, whose vibration or similar motion could cause loosening of the jack bolts whereby the loosened jack bolts could eventually escape and cause damage to the machinery.

FIGS. 2A and 2B illustrate a further embodiment of the fastener assembly of the present invention, herein designated by the reference numeral 22, to anchor a structure, a portion of which is identified by reference numeral 23, to a foundation 24. The structure 23 includes a suitable opening through which a fastener shank portion 25 extends. A projecting end portion of the shank portion 25 is provided with threads to engage with threads on a collar 26 which in this particular embodiment, as is apparent from FIG. 2B, takes the form of a sleeve ring. A staggered or alternating arrangement of concentric circles of drilled and tapped holes 27 is provided in the collar, and a jack bolt 28 is threaded in each tapped hole. The concentric bolt circles have their centers situated to coincide with the axial center of the threads in the collar 26. Each jack bolt includes a threaded "loading" portion 28A, that extends to an elongated and slightly reduced diameter cylindrical shank portion 28B which has a wrenchable head portion 28C formed at the distal end thereof. The relative difference between the diameter of the shank portion 28B and that of threaded portion 28A is somewhat exaggerated in FIG. 2A for purposes of clarity in illustration. A more realistic representation of these relative diameters is provided in FIG. 8. Note that the drilled and tapped holes 27 are similar in configuration to holes 20 depicted in FIG. 1. That is, holes 27, which are perhaps best seen in FIG. 8, include a shoulder 27A formed between a threaded region 27B adjacent the loading side of the collar and a slightly reduced diameter unthreaded region 27C adjacent the wrenching side of the collar. Consequently, as in the FIG. 1 embodiment, because of the unthreaded region 27C in each of the drilled and tapped holes 27, the jack bolts 28 cannot escape from the "wrenching" side of the collar because shoulder 20A forms an abutment for preventing threading of the jack bolts beyond a predetermined position in a direction toward the wrenching side of the collar.

The shank region 28B is supported along virtually its entire length by the unthreaded region 27C in the hole 27 to prevent buckling along the length of the shank. The terminal end of the threaded region 28A extends from the "loading" side of the collar 26 into engagement with a thrust ring or washer 29. The ring 29 can be made of metal or other material of a selected hardness to avoid upsetting of the end faces of the bolts in contact with the ring. As noted hereinabove, the opposite end of each jack bolt 28 extends from the wrenching side of the collar and has a head 28C to receive a socket coupled to a suitable torque wrench or the like. For illustrative purposes only, in FIGS. 2A and 2B there are twenty-four jack bolts 28 arranged in the flange or collar 26 with twelve jack bolts spaced about the center of the fastener shank portion 25 in an alternating arrangement. It is to be understood, of course, that the number of jack bolts that can be arranged in a given collar member is selected according to the desired stress that is to be imposed on the shank portion 25 of the fastener. Furthermore, the jack bolts can be arranged in only one bolt circle, as in FIG. 8, although two or more bolt circles may be used to accommodate a required number of jack bolts, as in FIGS. 2A and 2B.

In FIGS. 3A and 3B, a third embodiment of the fastener assembly according to the present invention is illustrated which differs from those already described by the fact that jack bolts 30 are engaged in drilled and tapped holes spaced about a bolt circle in the head portion of a bolt 32. The bolt shown in FIG. 3A forms part of an anchor for a machine element 33. A shank portion 34 of the bolt member 32 extends through an opening in the machine element and projects into a foundation where it is anchored in a suitable, well-known manner. The jack bolts 30 and the drilled and tapped holes for receiving the jack bolts are configured similarly to those shown in FIGS. 1A, 1B and 7. That is to say, the jack bolts 30 are embodied as screw fasteners having recessed hexagonally-shaped "Allen" socket head portions 30A formed therein for receiving an appropriately sized "Allen" wrench which is sized so as to just fit through the unthreaded regions of the drilled and tapped holes adjacent the wrenching side of the head of the bolt 32. And, similar to the embodiment described hereinabove with regard to FIGS. 1A, 1B and 7, each of the jack bolts 30 have a length sufficient to extend through the threaded regions of the drilled and tapped holes and outwardly from the loading side of the bolt head to present an end portion extending into compressive or loading engagement with a hardened steel support ring 35.

Figure 8:
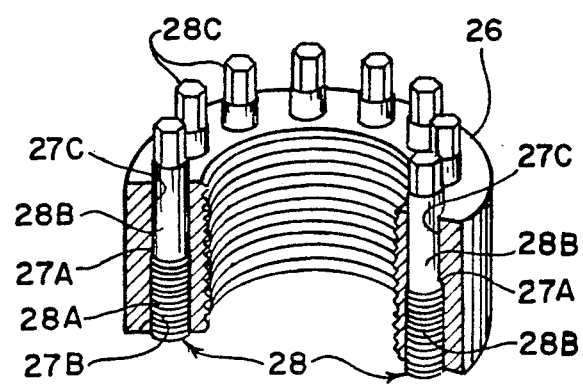
FIG. 8 is a perspective sectional view of a portion of a fastener apparatus similar to that depicted in FIG. 2.

It will be further understood that, although not illustrated, the jack bolts 30 and their associated drilled and tapped receiving holes may be configured to assume the shapes of those previously described in regard to the embodiments of the present invention represented in FIGS. 2A, 2B and 8.

In FIG. 4, there is illustrated a still further embodiment of the present invention in which a fastener assembly 40 is part of a roll assembly for use in a 2-high rolling mill. The rolling mill includes spaced-apart mill housings 41 and 42 each having window openings into which bearing chocks are received and carry bearings on journals at opposite ends of upper and lower roll assemblies 44 and 45. An end portion of each roll assembly extends to coupling a member 47 of a spindle which is coupled to a drive at one side of the mill stand. A screw down is provided in the mill housing for adjusting one roll assembly relative to the other. The rolls are held apart by roll balance cylinders, not shown. Each roll assembly includes spaced-apart arbors 48 and 49 mounted in bearings received in bearing chocks 50 and 51, respectively.

A tension shaft 52 has a threaded end portion engaged with threads formed in an opening in arbor 48 and extends through an opening in arbor 49. Shaft 52 is centered and supported by a collar 54 on the shaft 52 in the opening in arbor 49. Projecting outwardly beyond the collar portion 54 is a threaded end portion, the threads of which engage with threads on a flange 55. A hardened ring 56 is positioned between the flange 55 and arbor 49. The ring can be made of a relatively soft material, if desired, to prevent upsetting of the ends of the jack bolts. The flange is provided with a plurality of spaced-apart drilled and tapped holes (similar to holes 27) each of which receives a jack bolt 57 (similar to jack bolt 28). A roll sleeve 59 has an enlarged central bore which is sufficiently large so that an annular gap is formed between the roll sleeve and the tension shaft. Opposite end surfaces of the roll sleeve include an annular support surface 60 and an outwardly-tapering conical clamping surface 61 which engage with mating surfaces formed in the arbors. The clamping force which can be developed by the jack bolts is sufficient to maintain the arbors tightly clamped to the roll sleeve even when the roll assembly is subjected to a massive separating force occurring during the rolling operation. The rolling forces are transmitted from the sleeve while supported only at its ends by the arbors. A gap or space between the sleeve and the tension member is intended and this space is so great that no contact exists therebetween. A particular advantage in using a fastener apparatus such as fastener assembly 40 (which has jack bolts that cannot escape) in a dynamic machine such as a rolling mill, for example, is that the jack bolts cannot free themselves due to vibration or similar motion in the rolling mill and cause damage to the rolling mill machinery.

FIGS. 5A and 5B illustrate a further embodiment of the present invention as a backup roll assembly for 4-high rolling mill. As is well known in the art, two backup roll assemblies are supported by spaced-apart mill housings to transfer rolling loads from relatively small diameter work rolls to the mill housings. The backup roll assembly shown in FIG. 5 includes spaced-apart bearing chocks 60 and 61, each of which supports bearing assemblies that are mounted on arbors 62 and 63, respectively. Arbor 62 has a central bore that is enlarged by a counterbore that is threaded and receives the threaded end portion of a tension rod 64. The tension rod extends through a central opening in arbor 63 where the rod is held in a central position therein by a collar 65. An end portion of the tension rod extends from the arbor 63 and has threads that mate with threads formed on a collar 66. A hardened ring 67 is positioned between the arbor 63 and the collar for engagement with the end parts of the multitude of jack bolts 68 which, again, are similar in configuration to jack bolts 28. For the purpose described previously, the hardened ring can be replaced with a ring made of relatively soft metal. Merely for purposes of illustration, it is contemplated that between 200 and 250 jack bolts be spaced apart about six different and concentric bolt circles to stress the tension rod 64 which has a nominal diameter of about 15 inches. The jack bolts can develop at least 6,000,000 pounds and up to 12,000,000 pounds of stress on the tension rod which is sufficient to withstand a nominal rolling load of 12,000,000 pounds on the roll sleeve. This is 300% more than an anticipated rolling load. The roll sleeve can have a nominal outside diameter of 50 inches and a length of 86 inches. The opposite ends of a roll sleeve are supported by the arbors in the same manner as described previously in regard to the embodiment of FIG. 4.

A still further embodiment of the present invention illustrating a rolling mill arrangement using a pair of cooperating grooved roll assemblies 70 and 71 is shown in FIG. 6. The roll assemblies cooperate to form a roll gap having a square configuration. Each of the roll assemblies includes a roll collar 72 which is supported on an end portion of a shaft 73 extending in cantilevered fashion from a bearing housing 74 wherein an anti-friction bearing 75 supports the shaft. Between the collar 72 and the shaft 73 there is an annular tapered sleeve 76 which is pressed into a tapered gap between the roll collar and the shaft by a plurality of jack bolts 77 (similar in configuration, once again, to jack bolts 28) spaced apart along a bolt circle defined on a nut collar 78. The collar 78 includes a central threaded portion which is threadedly engaged with threads on the end of the shaft 73. To facilitate assembly and disassembly of the roll sleeves on the shafts, sleeve 76 is provided with a large tapered angle, e.g., 12 degrees. The jack bolts 77 can be tightened to relatively low torque levels for forcing the tapered sleeve tightly between the collar 72 and the shaft 73.

Figure 9:
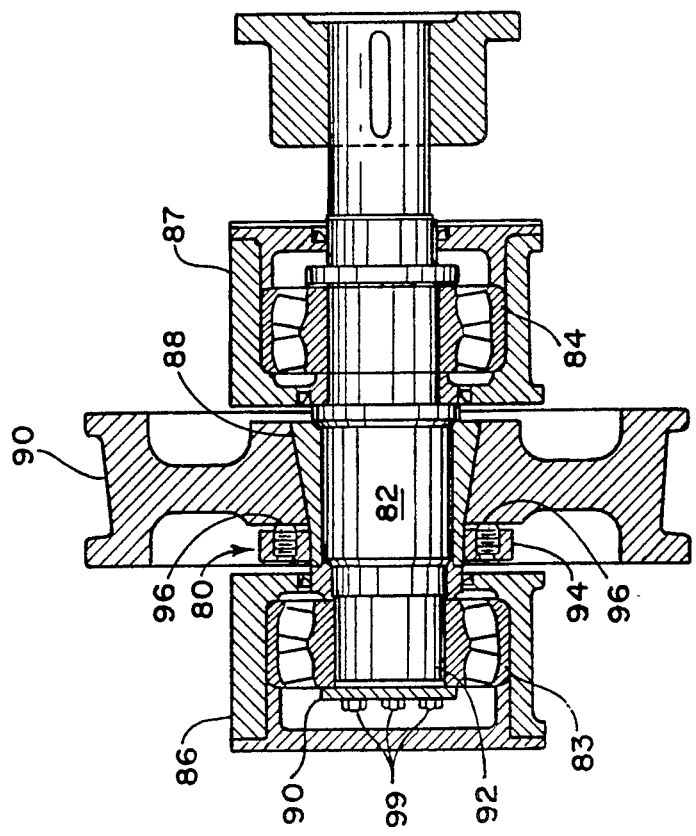
FIG. 9 is a partial sectional view illustrating the use of the apparatus of the present invention for clamping a crane wheel on a tapered shaft.

FIG. 9 depicts another embodiment of the present invention representing use of a fastener assembly 80 as a shaft mounting system that eliminates the need for keyways and further includes structure for providing a self-releasing taper for enabling simplified release of structure fastened to a shaft. According to FIG. 9, there is provided a driven right-cylindrical shaft 82 rotatably supported between a pair of anti-friction bearings 83 and 84 contained within bearing housings 86 and 87, respectively. Tightly press-fitted or otherwise fixedly secured to shaft 82 between bearings 83, 84 is an annular tapered sleeve 88. Releasably attachable to the periphery of tapered sleeve 88 is a wheel structure, such as, for example, crane wheel 90 having previously formed in its hub a taper matching that of tapered sleeve 88.

Figure 7:
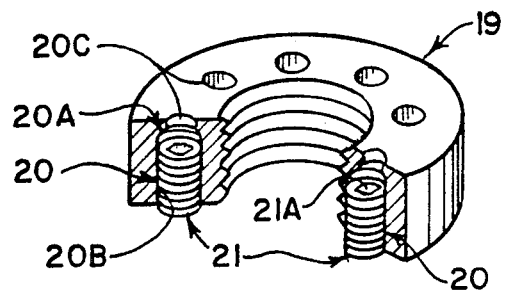
FIG. 7 is a perspective sectional view of a portion of the fastener apparatus depicted in FIG. 1.

Mounting of the crane wheel 90 to shaft 82 is as follows. The crane wheel is first slid over a free end portion 92 of shaft 82 and then over tapered sleeve 88. A collar members 94 of a fastener assembly 80 similar to that shown in FIG. 7 is then threaded onto the tapered sleeve to retain the crane wheel on the shaft. A plurality of jack bolts 96 carried by collar 94 are then tightened to the desired torque to fix the crane wheel 90 to rotate with the shaft 82, the tapered sleeve thereby acting as an anchor flange for the crane wheel. The bearing 83 and its housing 86 are then slid over shaft end portion 92 and retained thereon by plate 98 and bolts 99 which are threadedly engaged in end portion 92. Removal of the crane wheel is performed by the reverse procedure. Moreover, the direction of the mating taper between the crane wheel and the tapered sleeve enables the crane wheel to be easily removed from the shaft simply by pulling the crane wheel in the direction of end portion 92 upon removal of fastener assembly 80. As before, the entrapped jack bolts 96 are prevented from escaping and causing damage to the surrounding machinery, e.g., bearing 83.

Figure 10:
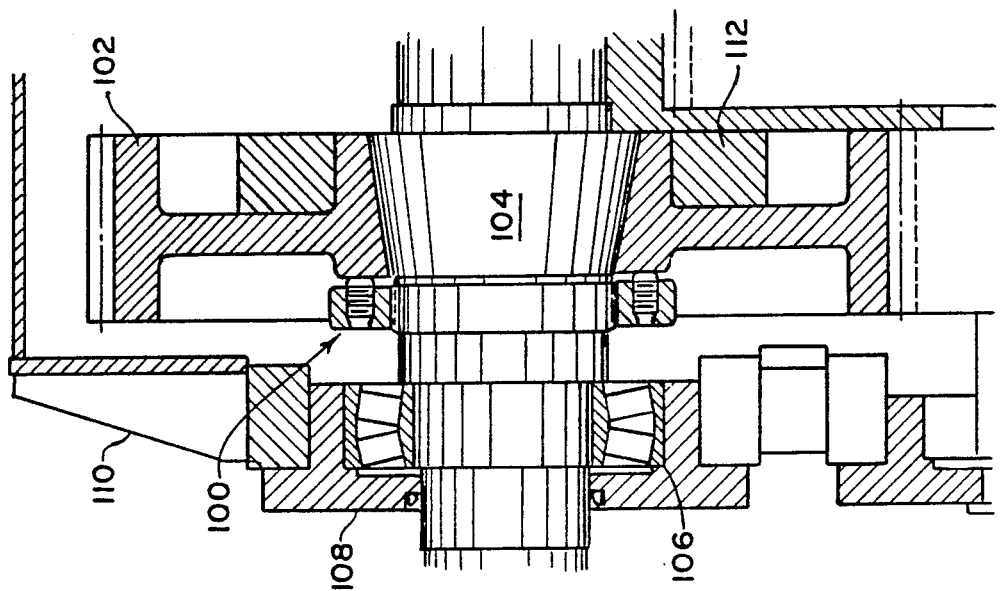
FIG. 10 is a partial sectional view illustrating the use of the apparatus of the present invention for clamping a reinforced gear wheel on a tapered shaft.

In FIG. 10, a further embodiment of the fastener assembly of the present invention, herein designated by the numeral 100, is shown for use in mounting a gear 102 to a tapered shaft 104. Fastener assembly 100 is also similar to that shown in FIG. 7. And, like the crane wheel 90 of FIG. 9, the hub of gear 102 is tapered, in this instance to mate with the tapered shaft 104. Shaft 104 is rotatably supported by anti-friction bearing 106 borne in bearing housing 108 which is attached to housing 110. A shrink ring 112 may be added to strengthen the hub if necessary. It is also possible that shaft 104 could be a cylindrical shaft having a tapered sleeve similar to sleeve 88 in FIG. 9 fixed thereto by retrofitting in order that the shaft may accept the tapered hub of the gear 102.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. A fastener apparatus to compress a support member, said apparatus including an elongated shank part extending from said support member and passed through an opening in said support member, said shank extending part and said support member in said opening having a mechanically free relationship throughout the length of said shank part, an anchor flange connected to one end portion of said elongated shank part for exerting a compressive force on a first portion of said support member, a stress generating flange connected to an opposite end portion of said elongated shank part for exerting a compressive force on a second portion of said support member, said stress generating flange having a plurality of holes at spaced-apart locations about an outer peripheral part thereof to overlie said support member, each of said holes comprise an unthreaded first region arranged closest to said first side of said stress generating flange and a second region arranged closest to said second stress generating flange and a shoulder forming an abutment between said first and second regions for preventing escape of said jack bolts from a first side of said stress generating flange, and a plurality of jack bolts threadedly engaged with said holes to separately receive a torque, said jack bolts including torqueable head portions extending through said first regions and from said first side of said stress generating flange, said jack bolts having end parts extending from a second side of said stress generating flange and through said holes to stress said elongated shank part extending between said anchor flange and said stress generating flange through torquing said jack bolts for applying said compressive reaction forces on said support member.

2. The apparatus of claim 1 wherein said abutment means are formed integrally with said holes.

* * * * *